3,296,186
STABILIZATION OF EPOXIDIZED POLYMERS OF BUTADIENE WITH PARA-BENZOQUINONE
Louis T. Gunkel, Pasadena, Md., assignor to FMC Corporation, New York, N.Y., a corporation of Delaware
No Drawing. Filed June 5, 1963, Ser. No. 285,614
5 Claims. (Cl. 260—45.7)

This invention relates to the stabilization of epoxidized polymers of butadiene, and more particularly, to a method of reducing the peroxygen content of epoxidized polymers of butadiene.

Epoxidized polymers of butadiene are clear, viscous resins which may be cured with polyfunctional active hydrogen curing agents to form useful thermoset products having excellent electrical and mechanical properties. These resins are useful for encapsulating, casting, molding, laminating, and coating.

One of the problems encountered in the use of epoxidized polymers of butadiene is that batches of the product have varying degrees of viscosity stability. When an epoxidized polymer of butadiene is to be cured with a typical curing system such as a dicarboxylic anhydride and a glycol, the resin and the curing agent are separately heated to reduce their viscosity before blending. As a result, after repeated heatings, the resin which is not immediately used tends to increase in viscosity at a rate proportional to its degree of instability and the length of time it is held at the elevated temperature. In many cases, the viscosity will eventually increase to an unworkable level and the remainder of the batch will be lost.

The stability problem becomes even more serious when the epoxidized polymer is admixed with a vinylbenzene. In casting and encapsulating applications, the epoxidized polymer is generally cured with a curing system containing a vinylbenzene. When such a system is used, it is desirable to first blend the epoxidized polymer with the vinylbenzene, and thereafter handle the resin as a preformed mixture. The viscosity of such a resin-vinylbenzene mixture is substantially lower than that of the resin alone, and thus is more readily handled. This mixture is readily cured at any desired time by blending it with dicarboxylic anhydride, glycol and peroxide, and heating the blend to the cure temperature. However, it has been found that these preformed mixtures in most cases have a relatively short shelf-life, in some cases not more than a few days. Furthermore, the thermoset resins formed by curing these preformed mixtures in many cases have a cloudy appearance which is accompanied by impaired strength and thermal properties.

There has been much investigation in recent years of methods of stabilizing epoxidized polymers of butadiene. Apparently due to the fact that the type of peroxygen group introduced into the resin during epoxidation is quite different from the type formed during autoxidation of a vinyl monomer, or added during polymerization of a vinyl monomer, conventional polymerization inhibitors have proven ineffective for stabilizing epoxidized polymers of butadiene. It has been suggested by G. Nowlin and M. H. Reich in a copending application, Serial No. 95,796, filed March 15, 1961, now Patent No. 3,133,092, that epoxidized polymers of butadiene can be stabilized by heating them in the presence of hydroquinone to a temperature of at least 40° C., and preferably 70–130° C., for a period of at least 10 minutes, and preferably 30 minutes to 2 hours. Although this was the best method known heretofore for stabilizing epoxidized polymers of butadiene, it is effective for only about 1 out of every 4 resin batches, and even then it is necessary to add a secondary inhibitor such as tert-butyl catechol to achieve complete and permanent stability. Moreover, this procedure causes a sharp increase in the color of the resin; in many cases the resin becomes almost black.

It is an object of this invention to provide a method of consistently stabilizing all epoxidized polymers of butadiene.

Another object is to provide epoxidized polymers of butadiene which consistently have a good pot-life when warmed.

Another object is to provide epoxidized polymers of butadiene which consistently have a good shelf-life when in admixture with a vinylbenzene.

Still another object is to provide epoxidized polymers of butadiene which can be cured with curing systems containing a vinylbenzene to consistently form a homogeneous, thermoset product having good strength properties.

These and other objects will become apparent from the following description of this invention.

I have now discovered that epoxidized polymers of butadiene can be consistently and permanently stabilized by the addition of 0.01–1.0 part of para-benzoquinone per 100 parts of epoxidized polymer of butadiene. No matter how unstable the crude epoxidized polymer is, it can be completely stabilized in this manner without the necessity of the heat treatment previously required with hydroquinone. The resulting epoxidized polymers of butadiene have an extremely long shelf-life and pot-life, even when in admixture with a vinylbenzene and no unduly long induction period is experienced upon curing these epoxidized polymers. Moreover, epoxidized polymers treated in accordance with this invention can be cured to homogeneous products having very good strength, thermal and color properties.

The epoxidized polymers of butadiene which may be stabilized by the method taught herein are prepared by epoxidizing a liquid polymer of butadiene. Suitable polymers of butadiene include polybutadienes (homopolymers of butadiene) and copolymers of butadiene containing at least 50% by weight butadiene. Any conventional ethylenically unsaturated monomer may be used as the comonomer including vinylbenzenes such as styrene, vinyltoluene, alpha-methylstyrene, dimethylstyrene and diethylstyrene; acrylates such as acrylonitrile, methacrylonitrile, methyl acrylate, methyl methacrylate and ethyl acrylate; vinyl esters such as vinyl acetate and vinyl propionate; vinyl halides such as vinyl chloride and vinyl bromide; vinyl ethers such as vinyl ethyl ether and vinyl isobutyl ether; vinyl ketones such as methyl vinyl ketone and methyl isopropenyl ketone; and vinyl alcohol, as well as many other well known ethylenically unsaturated monomers. In other words, it makes no difference what the comonomer is, so long as at least 50% of the polymer is derived from butadiene.

These polymers of butadiene may be prepared by any conventional polymerization technique, such as emulsion or solution polymerization using a variety of catalyst, including free-radical, alkali metal, Friedel-Crafts, and organo-metallic catalysts. Preferably, the polymerization is carried out in the presence of a solvent with sodium as the catalyst. Useful techniques for the polymerization of butadiene and mixtures of butadiene and comonomers are described in Patent Nos. 2,631,175 and 2,791,618. Polymers of butadiene, having a relatively low viscosity when epoxidized, are prepared by solution polymerization using an alkali metal catalyst and a modifier such as dioxane. This technique is described by F. P. Greenspan and A. E. Pepe in Patent No. 3,030,336.

Condensation copolymers of butadiene and polyalkyl aromatic compounds such as xylene, mesitylene, tetralin, diethylbenzene, cymene, polymethyl naphthalenes and durene are also suitable for epoxidation to resins which can be stabilized by the method taught herein. These condensation copolymers may be prepared by well known techniques as is fully disclosed in a copending application of D. K. George and L. T. Gunkel, Serial No. 117,512, filed June 16, 1961, now Patent No. 3,245,977.

For the epoxidation of the polymer of butadiene, standard epoxidation techniques may be used. Aliphatic, aromatic and inorganic peracids, salts of peracids, peroxides and hydroperoxides are the most common of the effective epoxidizing agents. For convenience, the lower aliphatic peracids such as performic, peracetic, perpropionic, and perbutyric are preferred reagents. With these reagents, the epoxidation reaction may be carried out using a preformed peracid mixture, or the peracid may be formed in the reaction medium, generally by adding hydrogen peroxide to an aliphatic acid or anhydride medium. Peracids may be prepared in any known way, such as is described in "Organic Synthesis," Reinhold Publishing Corp. (1957), page 302. A number of epoxidation techniques for polymers of butadiene are illustrated in U.S. Patent Nos. 2,829,130 and 2,829,135 to Greenspan and Light.

Preferably, the epoxidation is carried out by the in situ formation of peracetic acid, whereby the polymer of butadiene is reacted with acetic acid and hydrogen peroxide in the presence of an ion exchange resin and a solvent. The solvent may be any low-boiling solvent for the product, such as benzene or toluene. When the reaction is complete, the epoxidation product is allowed to separate into an aqueous phase and a solvent phase. The solvent is then removed from the resin product by vacuum stripping. This method of epoxidation is described by Greenspan and Gall, in U.S. Patent No. 2,919,283.

The epoxidation may be conducted using stoichiometric amounts of the peracid; that is, one mole of peracid per double bond in the polymer; or an amount below that theoretically required may be used. There is no significant advantage in using excess oxidant. In general, the epoxidized polymer should contain at least about 6% by weight of oxirane oxygen, and it is preferred for most applications to employ epoxidized polymers containing about 7–9% oxirane oxygen. Resins containing less than 6% oxirane oxygen may be used, but reactivity with curing agents is reduced and the resulting products may not be completed cured. Epoxidized polymers containing more than about 12% oxirane oxygen tend to be extremely viscous, and difficult to prepare, although they may actually be desired for specific applications such as coatings.

Although any of the epoxidized polymers of butadiene described above may be stabilized in accordance with this invention, it is preferable to treat freshly prepared epoxidized polymers. Since the peroxygen content of untreated epoxidized polymers promotes the further buildup of peroxygen, freshly prepared resin should be protected with a blanket of oxygen-free gas such as nitrogen, or in some other way protected until the peroxygen content has been reduced. An especially suitable method for reducing the peroxygen content of freshly prepared resin is to add the benzoquinone to the crude epoxidized polymer just after the solvent has been removed by vacuum stripping.

The quantity of benzoquinone employed should be at least about 0.01 part by weight per 100 parts of resin, however the exact amount required will vary depending upon the amount of peroxygen present in the epoxidized polymer. The use of more than about 1.0 part of benzoquinone should be avoided, since excesses may give rise to lengthened induction periods during the curing of the resin. Preferably, about 0.1–0.3 part of benzoquinone is used per 100 parts of resin.

The temperature at which the benzoquinone is added to the epoxidized polymer of butadiene is not critical. In other words, the heat treatment previously required in the case of hydroquinone is not necessary when using benzoquinone. Commonly, the benzoquinone is added to the resin at room temperature or slightly warmer, but higher or lower temperatures may be used, if desired, without any noticeable effect.

The stabilization method of this invention consistently produces epoxidized polymers which are completely stable. Accordingly, these stable epoxidized polymers are particularly suitable for use in premixed epoxidized polymer compositions containing a vinylbenzene such as styrene, alpha-methyl styrene or vinyltoluene. In such compositions, the vinylbenzene is generally added in an amount of about 5–50 parts by weight per 100 parts of epoxidized polymer, and preferably about 20–40 parts. These premixed resin compositions are generally stable in appearance and viscosity, even after exposure to 90° C. for more than 40 hours.

Epoxidized polymers of butadiene which have been stabilized in accordance with this invention are cured in the same manner as conventional epoxidized polymers of butadiene, by reaction with polyfunctional active hydrogen curing agents. Illustrative examples of these curing agents include aliphatic and aromatic amines such as triethylenetetramine and metaphenylenediamine; polycarboxylic acids and anhydrides such as oxalic, maleic, fumaric, phthalic, hexahydrophthalic, tetrahydrophthalic, itaconic, maleic, succinic, chlorendic, and pyromellitic; anhydride-glycol mixtures containing glycols such as ethylene, diethylene, propylene and dipropylene; dihydroxyphenols such as resorcinol, catechol, and 2,2-bis(4-hydroxyphenyl)propane; amino acids such as para-aminobenzoic; and many others. A peroxide may also be used in combination with the above curing agents to react with the residual unsaturation contained in the epoxidized polymer, particularly when the resin composition contains a vinylbenzene.

The following examples, illustrating the stable epoxidized polymer compositions and the stabilization method taught herein, are presented without any intention that the invention be limited thereto. All parts and percentages are by weight.

The properties of the cured product described in these examples were determined in accordance with standard ASTM test methods. Flexural strengths were measured by ASTM method D790–60 using a straining rate of 0.01 inch per inch per minute. Tensile strengths were measured by ASTM method D638–61T using a speed of testing of 0.2 inch per minute. Rockwell hardnesses were determined by ASTM method D785–62 using the M scale, and heat distortion temperatures were measured by ASTM method D648–56 using a fiber stress of 264 p.s.i.

*Example 1*

Butadiene was polymerized as follows: About 4.3 parts of sodium as a 46% dispersion in kerosene and 162 parts of benzene were charged to an agitated reactor, the temperature was raised to 90° C., and 3.0 parts of technical grade butadiene was added. The temperature was maintained at about 85° C. while 97 parts of butadiene and 20 parts of dioxane were added over a period of 3.5 hours. The reaction ingredients were then cooled to 50° C. and added to 19 parts of glacial acetic acid. The mixture was filtered through 21 parts of soda ash, and the filtrate was stripped of volatiles over a temperature range of 19–55° C. at 23–57 mm. Hg. The residue was liquid polybutadiene, having an iodine number of 383 and a viscosity of 16.4 poises at 25° C., extrapolated to zero shear.

This polybutadiene was epoxidized as follows: About 100 parts of liquid polybutadiene, 100 parts of benzene, 31.6 parts of Dowex resin 50 X–12 (a sulfonated styrene-divinylbenzene polymer cross-linked with 12% divinylbenzene) and 16.2 parts of glacial acetic acid were heated with agitation to 60° C. About 70 parts of 50% hydrogen peroxide was then added over a period of 3 hours. The temperature was maintained at 60° C. for an additional 4 hours, the mixture was cooled to 30° C., mixed with 123 parts of benzene and 26 parts of soda ash, and allowed to settle. The oily layer was separated and filtered. The filtrate was heated to 80° C. to remove the water azeotropically, and then stripped of benzene at 80° C. and 60 mm. Hg. The epoxidized polybutadiene obtained as residue had an oxirane oxygen content of 8.98% and a viscosity of 1685 poises at 25° C., extrapolated to zero shear.

A 100-part sample of the epoxidized polybutadiene prepared above was mixed with 0.2 part of para-benzoquinone. A 30-ml. vial was filled to within ½ in. of the top with this resin composition, capped and placed in an oven at 90° C. The resin composition had not increased in viscosity after one week at 90° C. For comparison, a portion of the epoxidized polybutadiene containing no stabilizer was tested in the same manner and found to have approximately tripled in viscosity after one week at 90° C.

To determine whether the addition of para-benzoquinone has any deleterious effects upon the properties of the cured resin, the two resin compositions prepared above were cured as follows: One hundred parts of the resin composition was mixed with 80 parts of hexahydrophthalic anhydride and 8 parts of propylene glycol. The samples were precured at 100° C. for 2 hrs. and post-cured at 155° C. for 4 hrs. Additional samples were precured at 100° C. for 2 hrs. and post-cured for a total of 24 hrs. at 155° C. Determination of the physical properties of these cured samples gave the following data:

| p-Benzo-quinone, phr. | Post-cure, hrs. | Flexural Strength, p.s.i. | Tensile Strength, p.s.i. | Rockwell "M" Hardness | Heat Distortion Temp., °C. |
|---|---|---|---|---|---|
| 0.0 | 4 | 15,800 | 11,090 | 95 | |
|  | 24 | 15,230 | 7,170 | 104 | 107 |
| 0.2 | 4 | 16,910 | 10,410 | 94 | |
|  | 24 | 17,630 | 8,480 | 108 | 101 |

Another 100 parts of the epoxidized polybutadiene was mixed with 30 parts of styrene and 0.2 part of para-benzoquinone. A 30-ml. vial was filled to within ½ in. of the top with this resin composition, capped and placed in an oven at 90° C. The resin composition remained clear for more than 40 hrs. at 90° C. with no increase in viscosity. For comparison, another 100 parts of the epoxidized polybutadiene was mixed with 30 parts of styrene, but no para-benzoquinone was added, and this resin composition was tested in a similar manner. The sample containing no stabilizer gelled in less than 4 hrs. at 90° C.

*Example 2*

The polybutadiene prepared in Example 1 was epoxidized as follows: One hundred parts of polybutadiene was dissolved in 100 parts of benzene and 10 parts of 90% formic acid was added. The mixture was maintained at 60° C. while 90 parts of 50% aqueous hydrogen peroxide was added over a period of 2 hrs. The reaction continued at the reflux temperature of about 65° C. for an additional 6 hrs., after which the medium was cooled to 30° C., and the product was recovered in a manner similar to Example 1. The resulting epoxidized polybutadiene had an oxirane oxygen content of 9.0% and a viscosity of 2,000 poises at 25° C., extrapolated to zero shear.

For 100-part portions of the epoxidized polybutadiene prepared above were blended with 30 parts of styrene and 0.0, 0.1, 0.2 and 0.3 parts of para-benzoquinone, respectively. Four 30-ml. vials were filled to within ½ in. of the top with each of the resin compositions, capped and placed in an oven at 90° C. The sample containing no stabilizer was gelled after 4 hrs. at 90° C. The sample containing 0.1 part of para-benzoquinone remained clear for 20 hrs., while the samples containing 0.2 and 0.3 part of para-benzoquinone remained clear for more than 40 hrs. with no change in viscosity.

One hundred thirty parts of the resin composition containing 0.2 part of para-benzoquinone prepared above was mixed with 40 parts of a diethylene glycol-maleic anhydride 1:2 half ester, 40 parts of hexahydrophthalic anhydride and 1 part of cumene hydroperoxide and samples were cured by heating for 2 hrs. at 100° C. and post-curing for 4 hrs. at 155° C. Additional samples were precured for 2 hrs. at 100° C. and post-cured for a total of 24 hrs. at 155° C. Determination of the physical properties of the cured samples gave the following results:

| Procurement, hrs. | Flexural Strength, p.s.i. | Tensile Strength, p.s.i. | Rockwell "M" Hardness | Heat Distortion Temp., °C. |
|---|---|---|---|---|
| 4 | 16,350 | 7,440 | 104 | |
| 24 | 14,860 | 7,160 | 110 | 123 |

*Example 3*

A commercially available copolymer containing 70% butadiene and 30% styrene, prepared by sodium-catalyzed polymerization in the presence of dioxane as illustrated in Example 1 and having a molecular weight of 9,000 and an iodine number of 300, was epoxidized as follows: One hundred parts of the copolymer and 200 parts of toluene were heated to 70° C. and 270 parts of 40% peracetic acid was added over a period of 1 hr. The temperature was maintained at 70° C. for an additional 2.5 hrs., after which the mixture was cooled to 30° C., and the product was recovered in a manner similar to Example 1. The resulting epoxidized copolymer was a soluble semi-solid having a viscosity of about 600 poises, measured as a 75% solution in xylene at 25° C., and an oxirane oxygen content of 8.9% by weight.

A resin composition was prepared by mixing 100 parts of this epoxidized copolymer with 40 parts of styrene and 0.2 part of para-benzoquinone. A 30-ml. vial was filled to within ½ in. of the top with the resin composition, capped and placed in an oven at 90° C. The resin composition remained clear and viscosity stable for more than 40 hrs.

For comparison, another 100 parts of the epoxidized copolymer was mixed with 30 parts of styrene, but no stabilizer was added. This resin composition was tested as before and found to have gelled after 4 hrs. at 90° C.

*Example 4*

A condensation copolymer of butadiene was prepared as follows: A mixture of 300 parts of commercial mixed xylenes, 1000 parts of benzene and 45 parts of sodium were charged to an autoclave and heated to 95° C. and 1000 parts of butadiene was added at a pressure of 15 p.s.i.g. When the butadiene addition was complete, the reaction mixture was quenched in water, and neutralized. The oil phase was washed with water and stripped free of solvent to yield a copolymer having a viscosity of 2 poises at 25° C. and an iodine number of 313.

The copolymer was epoxidized as follows: One hundred parts of the copolymer was dissolved in an equal weight of benzene and epoxidized at 65° C. with a mixture of 10 parts of 90% formic acid and 95 parts of 50% aqueous hydrogen peroxide. The peroxide was added over a period of 2 hrs. After an additional 6 hrs. of reaction, a viscous product was obtained which contained 7.5% oxirane oxygen and had a viscosity of 35 poises at 25° C.

Four 100-part portions of the epoxidized butadiene-xylene copolymer were blended with 30 parts of styrene and 0.0, 0.1, 0.2 and 0.3 part of para-benzoquinone, respectively. Four 30-ml. vials were filled to within ½ in. of the top with each of the resin compositions, capped and placed in a 90° C. oven. The resin composition containing no stabilizer was cloudy after 5 hrs. The resin compositions containing 0.1 and 0.2 part of para-benzoquinone gelled after 15 and 20 hrs., respectively.

The sample containing 0.3 part of para-benzoquinone remained clear for more than 40 hrs.

While the stabilization method of this invention and the resulting stable resin compositions have been explained and exemplified in such manner that one skilled in the art can readily understand and practice the invention, numerous modifications and variations of the epoxidized polymer of butadiene and the amount of para-benzoquinone may be made without departing from the spirit of the invention or the scope of the following claims.

I claim:

1. A method of stabilizing an epoxidized polymer of butadiene having an oxirane oxygen content of at least 6% by weight in which at least 50% by weight of the polymer forming units are derived from butadiene, which comprises mixing the epoxidized polymer with 0.01–1.0 part by weight of para-benzoquinone per 100 parts of epoxidized polymer.

2. The method of claim 1 in which the epoxidized polymer of butadiene is epoxidized polybutadiene.

3. The method of claim 2 in which the epoxidized polybutadiene is mixed with 0.1–0.3 part by weight of para-benzoquinone per 100 parts of epoxidized polybutadiene.

4. A stable, curable resin composition which comprises an epoxidized polymer of butadiene having an oxirane oxygen content of at least 6% by weight in which at least 50% by weight of the polymer forming units are derived from butadiene, and 0.01–1.0 part by weight of para-benzoquinone per 100 parts of epoxidized polymer.

5. The resin composition of claim 4 in which the epoxidized polymer of butadiene is epoxidized polybutadiene.

References Cited by the Examiner
UNITED STATES PATENTS 2,867,672   1/1959   Hemmerich _____ 260—666.5

LEON J. BERCOVITZ, *Primary Examiner.*

M. J. WELSH, *Assistant Examiner.*

UNITED STATES PATENT OFFICE
CERTIFICATE OF CORRECTION

Patent No. 3,296,186                            January 3, 1967

Louis T. Gunkel

It is hereby certified that error appears in the above numbered patent requiring correction and that the said Letters Patent should read as corrected below.

Column 4, line 24, for "maleic" read -- malic --; column 5, line 64, for "For" read -- Four --; column 6, in the table, first column, line 1 thereof, for "Procurement" read -- Postcure --.

Signed and sealed this 24th day of October 1967.

(SEAL)
Attest:

Edward M. Fletcher, Jr.

Attesting Officer

EDWARD J. BRENNER

Commissioner of Patents